(12) United States Patent
Kawasaki

(10) Patent No.: US 8,804,801 B2
(45) Date of Patent: Aug. 12, 2014

(54) PEAK SUPPRESSOR, RADIO COMMUNICATION APPARATUS AND PEAK SUPPRESSION METHOD

(71) Applicant: Fujitsu Limited, Kawasaki (JP)

(72) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 51 days.

(21) Appl. No.: 13/659,088

(22) Filed: Oct. 24, 2012

(65) Prior Publication Data

US 2013/0142239 A1    Jun. 6, 2013

(30) Foreign Application Priority Data

Dec. 1, 2011    (JP) .................................. 2011-264052

(51) Int. Cl.
*H04B 3/46*    (2006.01)

(52) U.S. Cl.
USPC ........... 375/224; 375/260; 375/265; 375/267; 375/340; 375/343; 375/346; 375/350

(58) Field of Classification Search
CPC ... H04L 5/0007; H04L 27/2614; H04L 5/001; H04L 27/2623; H04L 27/2647; H04L 25/03343; H04L 27/2601; H04L 27/2624; H04L 27/3411; H04L 5/0023; H04L 1/1867; H03F 2200/435; H01S 3/10015

USPC ......... 375/224, 260, 262, 265, 267, 340, 343, 375/350; 370/203, 204, 205, 208, 209, 210

See application file for complete search history.

(56) References Cited

U.S. PATENT DOCUMENTS 8,619,903 B2 * 12/2013 Schmidt et al. ................ 375/296
2011/0249768 A1 * 10/2011 Kuwabara ..................... 375/295
2011/0268167 A1   11/2011 Sundstrom

FOREIGN PATENT DOCUMENTS

JP    2010-514298    4/2010

* cited by examiner

*Primary Examiner* — Dhaval Patel
(74) *Attorney, Agent, or Firm* — Katten Muchin Rosenman LLP

(57) ABSTRACT

There is provided a peak suppressor including a first peak position detector to detect a first time when amplitude of a transmission signal changes in a convex manner and exceeds a specific level as a first peak position, a second peak position detector to detect a second time that is different by a predetermined time from the first peak position when the amplitude of the transmission signal exceeds the specific level as a second peak position, a suppression signal generator to generate a suppression signal for suppressing the amplitude of the transmission signal to a value that is equal to or lower than the specific level, based on amplitude and phase of the transmission signal corresponding to the first and second peak positions detected by the first and second peak position detectors, and an adder to add the suppression signal generated by the suppression signal generator to the transmission signal.

7 Claims, 13 Drawing Sheets

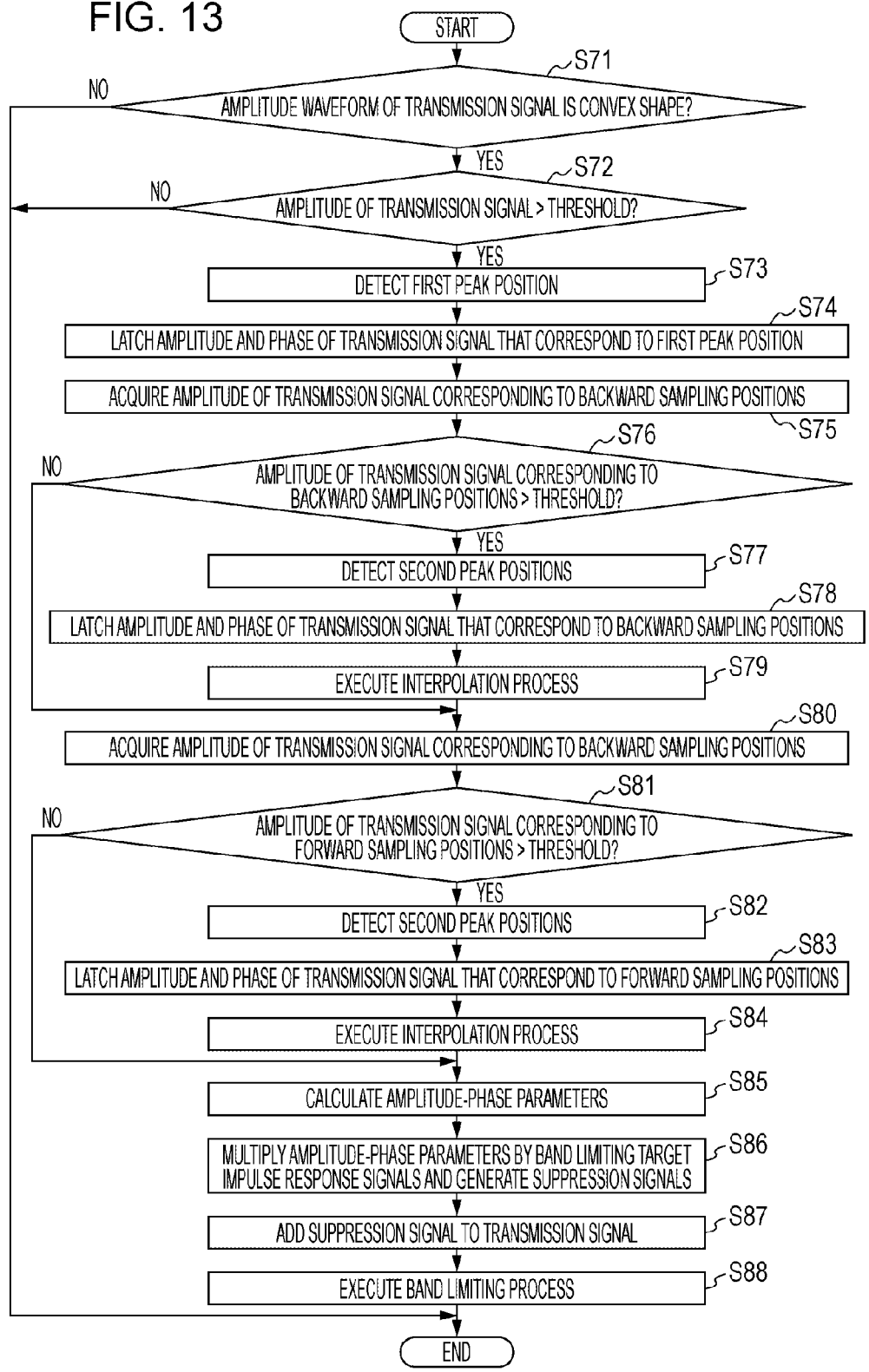

PEAK SUPPRESSOR, RADIO COMMUNICATION APPARATUS AND PEAK SUPPRESSION METHOD

CROSS-REFERENCE TO RELATED APPLICATION

This application is based upon and claims the benefit of priority of the prior Japanese Patent Application No. 2011-264052, filed on Dec. 1, 2011, the entire contents of which are incorporated herein by reference.

FIELD

The embodiments discussed herein are related to a peak suppressor, a radio communication apparatus and a peak suppression method.

BACKGROUND

A radio communication apparatus uses a power amplifier to amplify a transmission signal and transmits the transmission signal. A signal processing technique that is called a peak suppression process has been traditionally known. In the peak suppression process, the power amplifier is used in a saturated region in which a power efficiency is high.

In the peak suppression process, a time when the amplitude of the transmission signal exceeds a specific level (hereinafter referred to as a threshold) is detected as a peak position. A suppression signal for suppressing the amplitude of the transmission signal to a value that is equal to or lower than the threshold is generated using the amplitude and phase of the transmission signal that correspond to the peak position. The amplitude of the transmission signal is suppressed by adding the generated suppression signal to the transmission signal. In the peak suppression process, however, there is a possibility that as a deviation of a waveform of the suppression signal from a waveform of the transmission signal corresponding to the peak position increases, the accuracy of the suppression is reduced.

To avoid this, the following technique has been proposed. The technique is to hold a plurality of suppression signals having different waveforms, select a suppression signal having the most appropriate waveform for a waveform of a transmission signal corresponding to a peak position of the transmission signal, and add the selected suppression signal to the transmission signal.

Japanese National Publication of International Patent Application No. 2010-514298 is an example of related art.

SUMMARY

According to an aspect of the invention, a peak suppressor includes a first peak position detector configured to detect a first time when amplitude of a transmission signal changes in a convex manner and exceeds a specific level as a first peak position, a second peak position detector configured to detect a second time that is different by a predetermined time from the first peak position when the amplitude of the transmission signal exceeds the specific level as a second peak position, a suppression signal generator configured to generate a suppression signal for suppressing the amplitude of the transmission signal to a value that is equal to or lower than the specific level, based on amplitude and phase of the transmission signal corresponding to the first and second peak positions detected by the first and second peak position detectors, and an adder configured to add the suppression signal generated by the suppression signal generator to the transmission signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a flowchart of procedures of a peak suppression process that is executed by the peak suppressor according to the fourth embodiment.

DESCRIPTION OF EMBODIMENTS

In the conventional technique for selecting a suppression signal having the most appropriate waveform, the accuracy of suppression can be improved. In the conventional technique, however, there is a problem that the size of a circuit is increased and a processing load increases.

Specifically, in the conventional technique, a memory that holds the plurality of suppression signals having the different waveforms is provided. Thus, the size of the circuit is increased by a size corresponding to the memory. In the conventional technique, a complex calculation process is executed in order to calculate signal shapes such as the amplitude, frequency and the like of the transmission signal and specify an amplitude waveform corresponding to the peak position of the transmission signal. As a result, the processing load increases.

Hereinafter, a peak suppressor, a radio communication apparatus and a peak suppression method, which are disclosed herein, are described in detail with reference to the accompanying drawings.

First Embodiment

Figure 1:
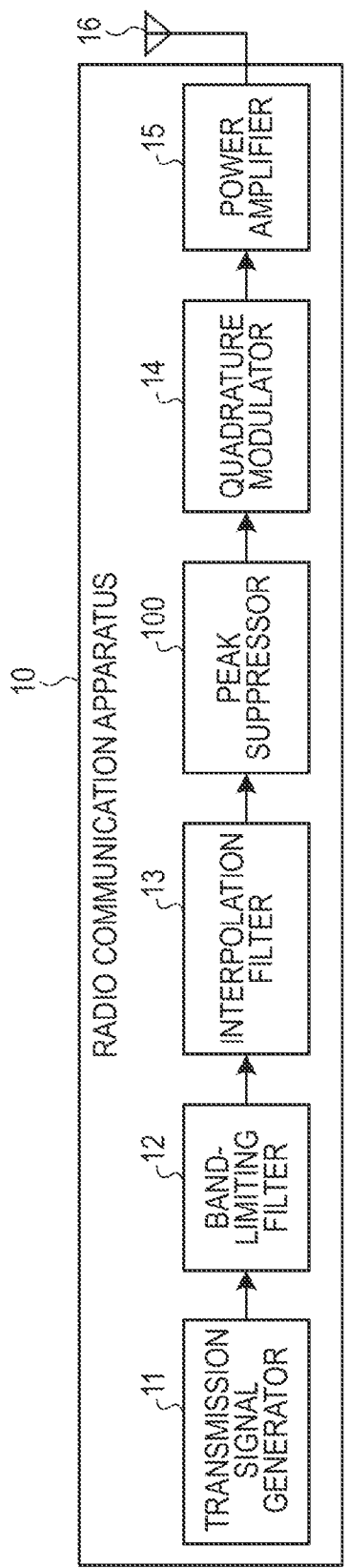
FIG. 1 is a block diagram illustrating the configuration of a radio communication apparatus that includes a peak suppressor according to a first embodiment.

First, the configuration of a radio communication apparatus 10 that includes a peak suppressor 100 according to the first embodiment is described with reference to FIG. 1. FIG. 1 is a block diagram illustrating the configuration of the radio communication apparatus 10 that includes the peak suppressor 100 according to the first embodiment. As illustrated in FIG. 1, the radio communication apparatus 10 includes a transmission signal generator 11, a band-limiting filter 12, an interpolation filter 13, the peak suppressor 100, a quadrature modulator 14 and a power amplifier 15.

The transmission signal generator 11 generates a transmission signal that is a baseband signal. The band-limiting filter 12 executes a band-limiting process on the transmission signal. The interpolation filter 13 interpolates data included in the transmission signal. The peak suppressor 100 suppresses a peak component included in the transmission signal and outputs the transmission signal with the suppressed peak component to the quadrature modulator 14. The quadrature modulator 14 multiplies the transmission signal by a signal having a predetermined frequency, thereby converts the transmission signal in a baseband into a transmission signal in a radio frequency band, and outputs the converted transmission signal to the power amplifier 15. The power amplifier 15 amplifies the transmission signal and outputs the amplified transmission signal to an antenna 16. The antenna 16 transmits the amplified transmission signal as a radio wave.

Figure 2:
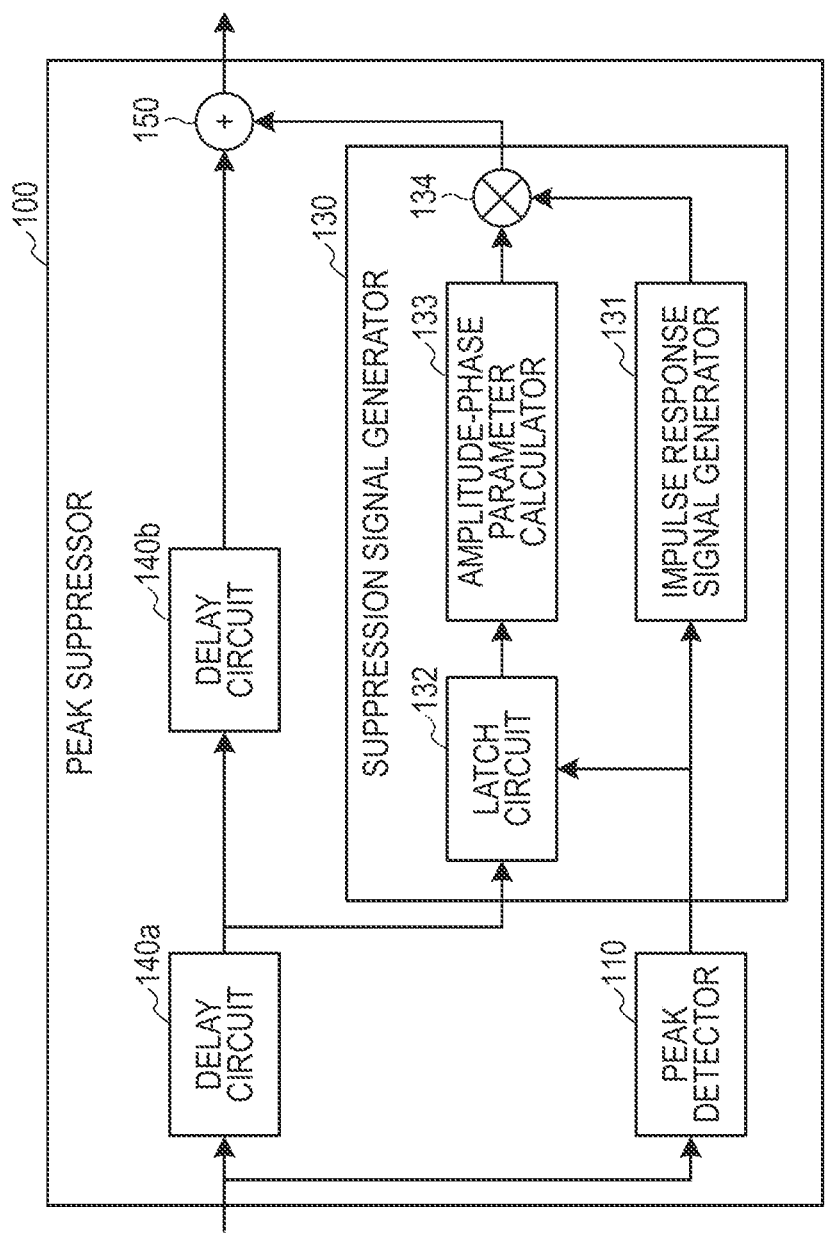
FIG. 2 is a block diagram illustrating the configuration of the peak suppressor according to the first embodiment.

FIG. 2 is a block diagram illustrating the configuration of the peak suppressor 100 according to the first embodiment. As illustrated in FIG. 2, the peak suppressor 100 includes a peak detector 110, a suppression signal generator 130, delay circuits 140a and 140b and an adder 150.

Figure 3:
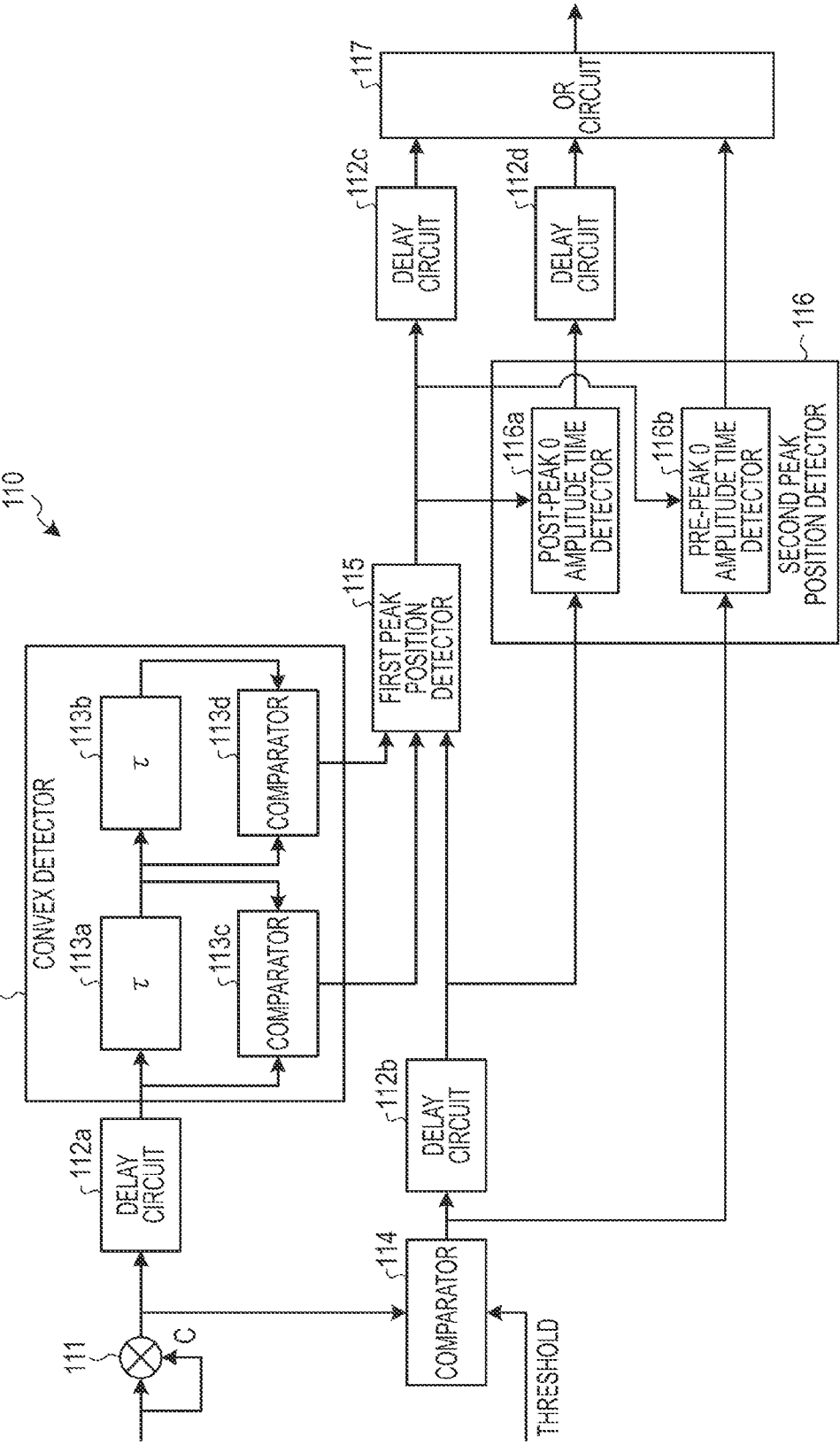
FIG. 3 is a block diagram illustrating the configuration of a peak detector according to the first embodiment.

The peak detector 110 detects a peak position of the transmission signal. FIG. 3 is a block diagram illustrating the configuration of the peak detector 110 according to the first embodiment. The peak detector 110 includes a complex multiplier 111, delay circuits 112a to 112d, a convex detector 113, a comparator 114, a first peak position detector 115, a second peak position detector 116 and an OR circuit 117.

The complex multiplier 111 multiplies the transmission signal by a conjugate complex number (indicated by C in FIG. 3) of the transmission signal so as to convert the transmission signal into a power value and outputs the power value to the delay circuit 112a and the comparator 114. The power value (of the transmission signal) output from the complex multiplier 111 is referred to as the "amplitude of the transmission signal" in some cases. Each of the delay circuits 112a to 112d delays the power value (of the transmission signal) input to the delay circuit.

The convex detector 113 detects a convex portion of an amplitude waveform of the transmission signal. The convex detector 113 includes delay circuits 113a and 113b and comparators 113c and 113d. Each of the delay circuits 113a and 113b delays the power value (of the transmission signal) input to the delay circuit by a time corresponding to one sampling interval.

Each of the comparators 113c and 113d compares the amplitude of the transmission signal before the delay corresponding to the one sampling interval with the amplitude of the transmission signal after the delay corresponding to the one sampling interval and outputs the result of the comparison to the first peak position detector 115. Specifically, the comparator 113c compares the amplitude A0 of the transmission signal to be input to the delay circuit 113a with the amplitude A1 of the transmission signal output from the delay circuit 113a. When A0<A1, the comparator 113c outputs a true signal "1". The comparator 113d compares the amplitude A1 of the transmission signal to be input to the delay circuit 113b with the amplitude A2 of the transmission signal output from the delay circuit 113b. When A1>A2, the comparator 113d outputs a true signal "1". In other words, when the amplitude A1 of the transmission signal is higher than other portions of the transmission signal, the comparators 113c and 113d output, to the first peak position detector 115, the true signals "1" indicating that the convex portion of the transmission signal has been detected.

The comparator 114 compares the amplitude of the transmission signal with a predetermined specific level (hereinafter referred to as threshold) Ath. When the amplitude of the transmission signal exceeds the threshold, the comparator 114 outputs, to the delay circuit 112b and the second peak position detector 116, a true signal "1" that indicates that the amplitude of the transmission signal exceeds the threshold.

The first peak position detector 115 detects, as a first peak position, a time when the amplitude of the transmission signal changes in a convex manner and exceeds the threshold. Specifically, when the first peak position detector 115 receives the true signals from the convex detector 113 and receives the true signal from the comparator 114 through the delay circuit 112b, the first peak position detector 115 detects, as the first peak position, the time when the peak of the convex portion of the transmission signal exists. Then, the first peak position detector 115 outputs the detected first peak position to the second peak position detector 116. In addition, the first peak position detector 115 outputs the detected first peak position to the OR circuit 117 through the delay circuit 112c.

The second peak position detector 116 detects, as a second peak position, a time when the amplitude of the transmission signal exceeds the threshold Ath, while the detected time that is the second peak position is different by a predetermined time from the first peak position. In the present embodiment, the second peak position detector 116 detects, as second peak positions, times when the amplitude of an impulse response signal (described later) is 0 and the amplitude of the transmission signal exceeds the threshold Ath. The second peak position detector 116 includes a post-peak 0 amplitude time detector 116a and a pre-peak 0 amplitude time detector 116b.

When the post-peak 0 amplitude time detector 116a receives the first peak position from the first peak position detector 115, the post-peak 0 amplitude time detector 116a monitors the amplitude of the transmission signal when the amplitude of the impulse response signal becomes 0 after a peak of the amplitude of the impulse response signal. The post-peak 0 amplitude time detector 116a detects, as a second peak position, the time when the amplitude of the impulse response signal becomes 0 after the peak of the amplitude of the impulse response signal and the amplitude of the transmission signal exceeds the threshold. Specifically, when the post-peak 0 amplitude time detector 116a receives, from the comparator 114 through the delay circuit 112b, a true signal indicating that the amplitude of the transmission signal exceeds the threshold Ath when the amplitude of the impulse response signal becomes 0 after the peak of the amplitude of the impulse response signal, the post-peak 0 amplitude time detector 116a detects, as the second peak position, the time when the amplitude of the impulse response signal becomes 0 after the peak of the amplitude of the impulse response signal and the amplitude of the transmission signal exceeds the threshold. Then, the post-peak 0 amplitude time detector 116a outputs the detected second peak position to the OR circuit 117 through the delay circuit 112d.

When the pre-peak 0 amplitude time detector 116b receives the first peak position from the first peak position detector 115, the pre-peak 0 amplitude time detector 116b monitors the amplitude of the transmission signal when the amplitude of the impulse response signal becomes 0 before the peak of the amplitude of the impulse response signal. The pre-peak 0 amplitude time detector 116b detects, as a second peak position, the time when the amplitude of the impulse response signal becomes 0 before the peak of the amplitude of the impulse response signal and the amplitude of the transmission signal exceeds the threshold. Specifically, when the pre-peak 0 amplitude time detector 116b receives, from the comparator 114, a true signal indicating that the amplitude of the transmission signal exceeds the threshold Ath when the amplitude of the impulse response signal becomes 0 before the peak of the amplitude of the impulse response signal, the pre-peak 0 amplitude time detector 116b detects, as the second peak position, the time when the amplitude of the impulse response signal becomes 0 before the peak of the amplitude of the impulse response signal and the amplitude of the transmission signal exceeds the threshold. Then, the pre-peak 0 amplitude time detector 116b outputs the detected second peak position to the OR circuit 117.

The OR circuit 117 receives the first peak position from the first peak position detector 115 through the delay circuit 112c. The OR circuit 117 receives the second peak position from the post-peak 0 amplitude time detector 116a of the second peak position detector 116 through the delay circuit 112d. The OR circuit 117 receives the second peak position from the pre-peak 0 amplitude time detector 116b of the second peak position detector 116. The OR circuit 117 outputs the received first peak position and the received second peak positions to the suppression signal generator 130.

Returning to FIG. 2, the suppression signal generator 130 uses the amplitude and phase of the transmission signal that correspond to the first peak position and the second peak positions, and thereby generates a suppression signal for suppressing the amplitude of the transmission signal to a value that is equal to or lower than the threshold. The suppression signal generator 130 includes an impulse response signal generator 131, a latch circuit 132, an amplitude-phase parameter calculator 133 and a complex multiplier 134.

When the impulse response signal generator 131 receives the first peak position and the second peak positions from the peak detector 110, the impulse response signal generator 131 generates an impulse response signal that has peaks at times corresponding to the first peak position and the second peak positions. The impulse response signal generator 131 outputs the generated impulse response signal to the complex multiplier 134.

The latch circuit 132 receives the first peak position and the second peak positions from the peak detector 110. The latch circuit 132 receives the transmission signal from the delay circuit 140a. The latch circuit 132 holds (latches) the amplitude and phase of the transmission signal that correspond to the first peak position and the second peak positions.

The amplitude-phase parameter calculator 133 calculates an amplitude-phase parameter that includes the difference between the latched amplitude of the transmission signal and the threshold Ath as the amplitude of the suppression signal and includes the latched phase of the transmission signal as the phase of the suppression signal. Specifically, when the latched amplitude of the transmission signal is indicated by r and the latched phase of the transmission signal is indicated by θ, the amplitude-phase parameter calculator 133 calculates the amplitude-phase parameter using the following Formula (1).

$$(Ath-r) \times \exp(j\theta) \qquad (1)$$

The complex multiplier 134 receives the amplitude-phase parameter from the amplitude-phase parameter calculator 133. The complex multiplier 134 receives the impulse response signal from the impulse response signal generator 131. The complex multiplier 134 executes complex multiplication of the amplitude-phase parameter and the impulse response signal and thereby generates a suppression signal. The complex multiplier 134 outputs the generated suppression signal to the adder 150.

Each of the delay circuits 140a and 140b delays the transmission signal and outputs the delayed transmission signal to the adder 150.

The adder 150 adds the suppression signal generated by the suppression signal generator 130 to the transmission signal. Thus, the adder 150 adds, to the transmission signal, a suppression signal generated on the basis of the amplitude and phase of the transmission signal corresponding to the first peak position and a suppression signal generated on the basis of the amplitude and phase of the transmission signal corresponding to the second peak positions. Thus, the amplitude of the transmission signal that corresponds to the first peak position and the second peak positions are suppressed to a value that is equal to or lower than the threshold Ath.

Figure 4:
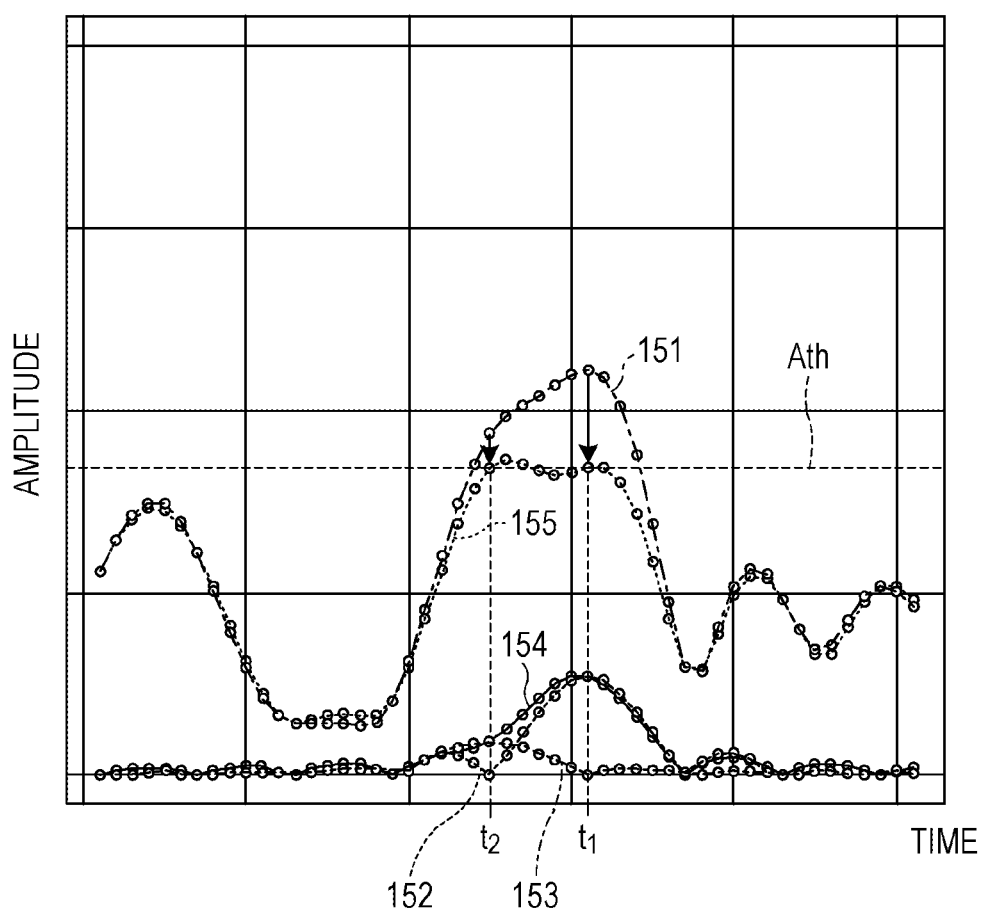
FIG. 4 is a diagram illustrating the case where the amplitude of a transmission signal is suppressed to a value that is equal to or lower than a threshold.

FIG. 4 is a diagram illustrating the case where the amplitude of transmission signal is suppressed to a value that is equal to or lower than the threshold. In FIG. 4, the abscissa indicates time, while the ordinate indicates the amplitude of the transmission signal. In FIG. 4, a curved line 151 indicates the amplitude of the transmission signal. Curved lines 152 and 153 indicate the amplitudes of impulse response signals. A curved line 154 indicates the amplitude of the suppression signal. A curved line 155 indicates the amplitude of the transmission signal to which the suppression signal has been added. A time t1 when the amplitude of the transmission signal indicated by the curved line 151 exceeds the threshold Ath is detected as a first peak position. A time t2 when the amplitude of the transmission signal exceeds the threshold Ath and the amplitude of the impulse response signal indicated by the curved line 152 is 0 is detected as a second peak position. Then, a suppression signal is generated from the amplitude and phase of the transmission signal that correspond to the time t1 detected as the first peak position, while a suppression signal is generated from the amplitude and phase of the transmission signal that correspond to the time t2 detected as the second peak position. By combining the suppression signals, the suppression signal indicated by the curved line 154 is formed. The suppression signal indicated by the curved line 154 is added to the transmission signal indicated by the curved line 151 by the adder 150. Thus, as indicated by the curved line 155, the amplitude of the transmission signal at the time t1 (first peak position) and the time t2 (second peak position) is suppressed to a value that is equal to or lower than the threshold Ath.

Figure 5:
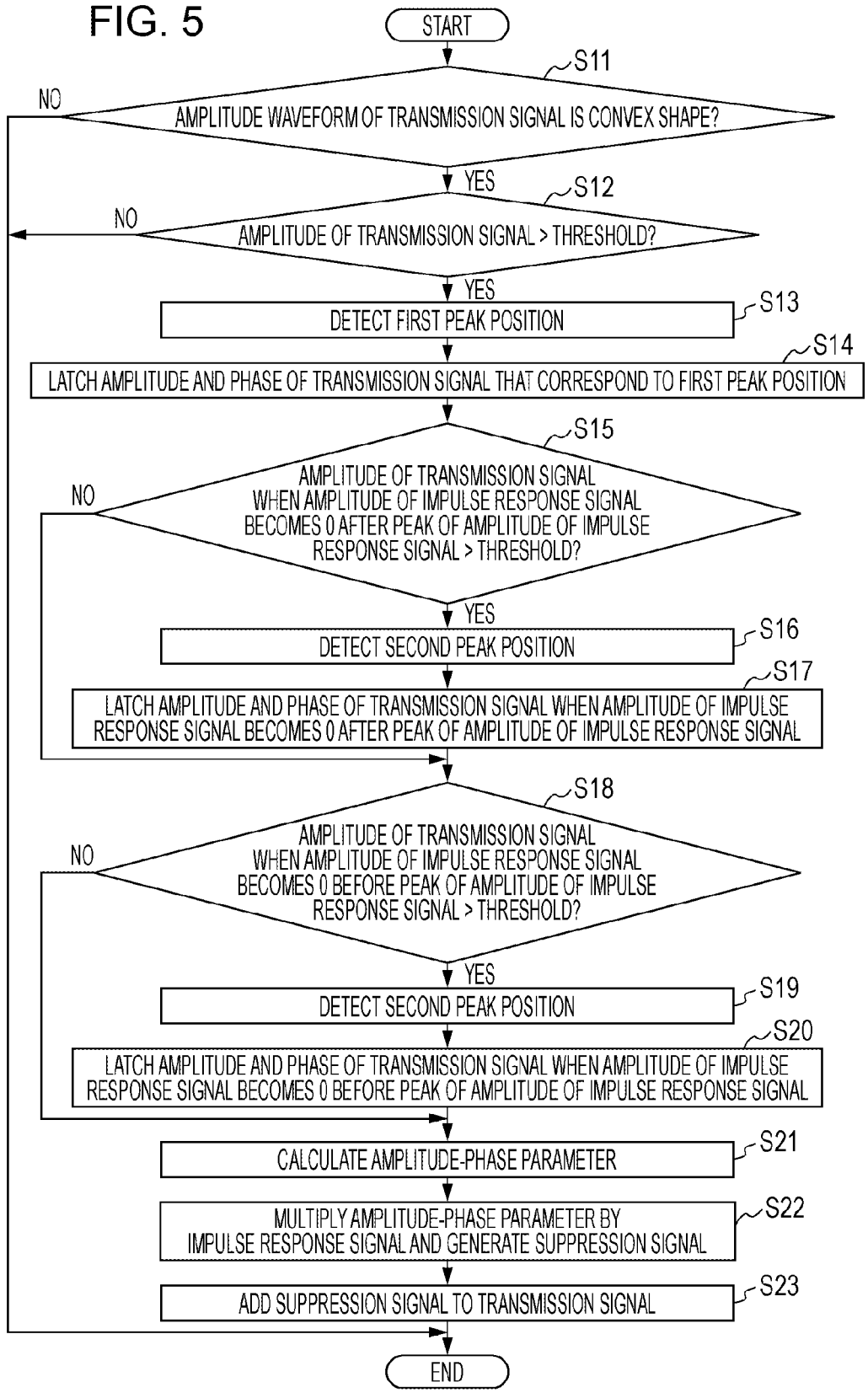
FIG. 5 is a flowchart of procedures of a peak suppression process that is executed by the peak suppressor according to the first embodiment.

Next, procedures of a peak suppression process that is executed by the peak suppressor 100 according to the first embodiment are described with reference to FIG. 5. FIG. 5 is a flowchart of the procedures of the peak suppression process that is executed by the peak suppressor 100 according to the first embodiment.

As illustrated in FIG. 5, the convex detector 113 of the peak detector 110 detects a convex portion of the amplitude waveform of the transmission signal (in operation S11). When the convex portion is detected by the convex detector 113 (Yes in operation S11), the comparator 114 compares the amplitude of the transmission signal with the threshold Ath (in operation S12). When the comparator 114 determines that the amplitude of the transmission signal exceeds the threshold Ath (Yes in operation S12), the first peak position detector 115 detects, as a first peak position, the time when the amplitude of the transmission signal exceeds the threshold Ath (in operation S13).

When the convex portion is not detected by the convex detector 113 (No in operation S11), or when the comparator 114 determines that the amplitude of the transmission signal does not exceed the threshold Ath (No in operation S12), the peak suppression process is terminated.

The latch circuit 132 of the suppression signal generator 130 latches the amplitude and phase of the transmission signal that correspond to the detected first peak position (in operation S14).

When the amplitude of the impulse response signal becomes 0 after the peak of the amplitude of the impulse response signal and the amplitude of the transmission signal is equal to or lower than the threshold Ath (No in operation S15), the post-peak 0 amplitude time detector 116a of the second peak position detector 116 causes the process to proceed to operation S18. When the amplitude of the impulse response signal becomes 0 after the peak of the amplitude of the impulse response signal and the amplitude of the transmission signal exceeds the threshold Ath (Yes in operation S15), the post-peak 0 amplitude time detector 116a detects, as a second position, the time when the amplitude of the impulse response signal becomes 0 after the peak of the amplitude of the impulse response signal and the amplitude of the transmission signal exceeds the threshold Ath (in operation S16). Then, the latch circuit 132 of the suppression signal generator 130 latches the amplitude and phase of the transmission signal that correspond to the second peak position that is the time when the amplitude of the impulse response signal becomes 0 after the peak of the amplitude of the impulse response signal (in operation S17).

When the amplitude of the impulse response signal becomes 0 before the peak of the amplitude of the impulse response signal and the amplitude of the transmission signal is equal to or lower than the threshold Ath (No in operation S18), the pre-peak 0 amplitude time detector 116b of the second peak position detector 116 causes the process to proceed to operation S21. When the amplitude of the impulse response signal becomes 0 before the peak of the amplitude of the impulse response signal and the amplitude of the transmission signal exceeds the threshold Ath (Yes in operation S18), the pre-peak 0 amplitude time detector 116b detects, as a second peak position, the time when the amplitude of the impulse response signal becomes 0 before the peak of the amplitude of the impulse response signal and the amplitude of the transmission signal exceeds the threshold Ath (in operation S19). The latch circuit 132 of the suppression signal generator 130 latches the amplitude and phase of the transmission signal that correspond to the second peak position that is the time when the amplitude of the impulse response signal becomes 0 before the peak of the amplitude of the impulse response signal (in operation S20).

The amplitude-phase parameter calculator 133 of the suppression signal generator 130 calculates an amplitude-phase parameter using the amplitude latched in operations S14, S17 and S20 and the phase latched in operations S14, S17 and S20 (in operation S21). Then, the complex multiplier 134 executes complex multiplication of the amplitude-phase parameter and the impulse response signal and thereby generates a suppression signal (in operation S22). The adder 150 adds the suppression signal to the transmission signal (in operation S23).

As described above, when the amplitude of the transmission signal at a time different by the predetermined time from the first peak position exceeds the threshold, the peak suppressor 100 according to the first embodiment detects the time different by the predetermined time from the first peak position as a second peak position. Then, the peak suppressor 100 generates a suppression signal using the amplitude and phase of the transmission signal that correspond to the first peak position and the second peak position. The peak suppressor 100 adds the generated suppression signal to the transmission signal. Thus, a suppression signal generated on the basis of the amplitude and phase of the transmission signal that correspond to the first peak position, and a suppression signal generated on the basis of the amplitude and phase of the transmission signal that correspond to the second peak position, are added to the transmission signal. Thus, the amplitude of the transmission signal that corresponds to the first and second peak positions is suppressed to a value that is equal to or lower than the threshold Ath. The peak suppressor 100, therefore, can accurately suppress peaks without having a memory and executing a complex calculation, unlike the conventional technique for selecting a suppression signal with the most appropriate waveform. As a result, the peak suppressor 100 can accurately suppresses the peaks while suppressing an increase in the size of the circuit and an increase in a processing load.

In the first embodiment, the second peak position detector 116 detects, as the second peak positions, the times when the amplitude of the impulse response signal is 0 and the amplitude of the transmission signal exceeds the threshold. In the first embodiment, when the amplitude of the impulse response signal is 0 and the amplitude of the transmission signal exceeds the threshold, the peak suppressor 100 can accurately suppresses the amplitude of the transmission signal when the amplitude of the impulse response signal is 0.

Second Embodiment

The first embodiment describes that the band-limiting filter 12 is arranged outside the peak suppressor 100. The second embodiment describes that the band-limiting filter 12 is arranged in the peak suppressor 100. In the following description, parts that are the same as those described above are indicated by the same reference numerals and symbols as those described above, and a detailed description thereof is omitted.

Figure 6:
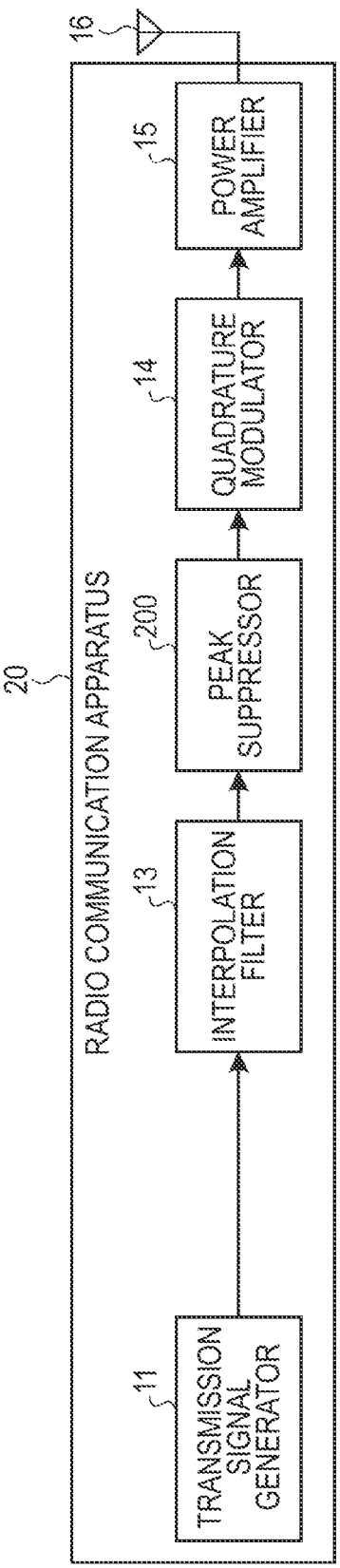
FIG. 6 is a block diagram illustrating the configuration of a radio communication apparatus that includes a peak suppressor according to a second embodiment.

First, the configuration of a radio communication apparatus 20 that includes a peak suppressor 200 according to the second embodiment is described with reference to FIG. 6. FIG. 6 is a block diagram illustrating the configuration of the radio communication apparatus 20 that includes the peak suppressor 200 according to the second embodiment. The radio communication apparatus 20 includes the transmission signal generator 11, the interpolation filter 13, the peak suppressor 200, the quadrature modulator 14, the power amplifier 15 and the antenna 16. The radio communication apparatus 20 further includes the band-limiting filter 12 that is arranged in the peak suppressor 200, unlike the first embodiment.

Figure 7:
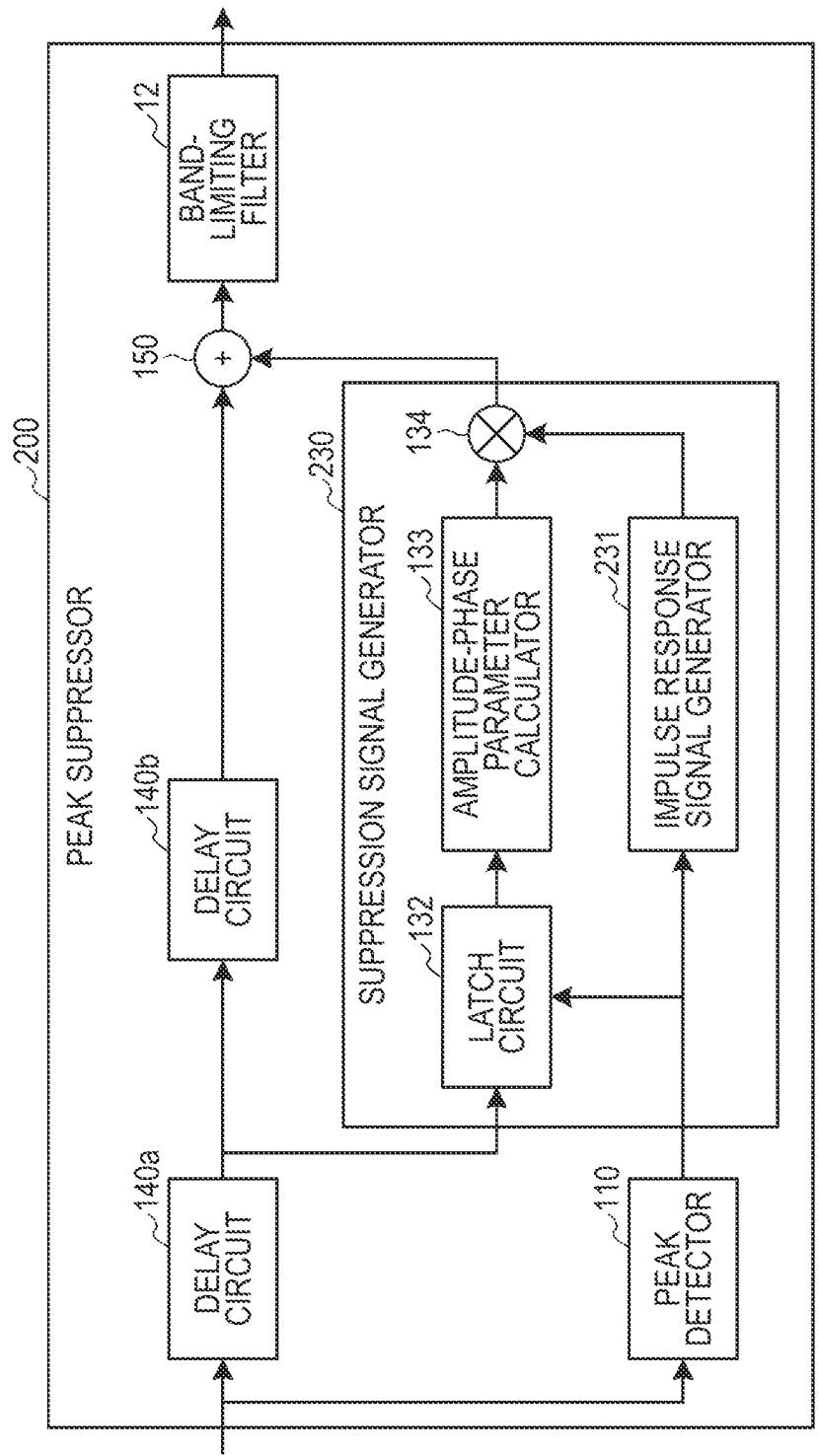
FIG. 7 is a block diagram illustrating the configuration of the peak suppressor according to the second embodiment.

FIG. 7 is a block diagram illustrating the configuration of the peak suppressor 200 according to the second embodiment. As illustrated in FIG. 7, the peak suppressor 200 includes the peak detector 110, a suppression signal generator 230, the delay circuits 140a and 140b, the adder 150 and the band-limiting filter 12.

The band-limiting filter 12 executes a band-limiting process on a combined signal that is the transmission signal to which a suppression signal has been added.

The suppression signal generator 230 has an impulse response signal generator 231 instead of the impulse response signal generator 131 described in the first embodiment. When the band-limiting filter 12 executes the band-limiting process on the combined signal, the impulse response signal generator 231 generates, as an impulse response signal, an impulse-like signal that has an amplitude including the amount of a change in the amplitude of the combined signal. Hereinafter, the impulse response signal generated by the impulse response signal generator 231 is referred to as a "band-limiting target impulse response signal". The impulse response signal generator 231 outputs the band-limiting target impulse response signal to the complex multiplier 134. Then, the complex multiplier 134 executes complex multiplication of the amplitude-phase parameter and the band-limiting target impulse response signal and thereby generates the suppression signal.

Figure 8:
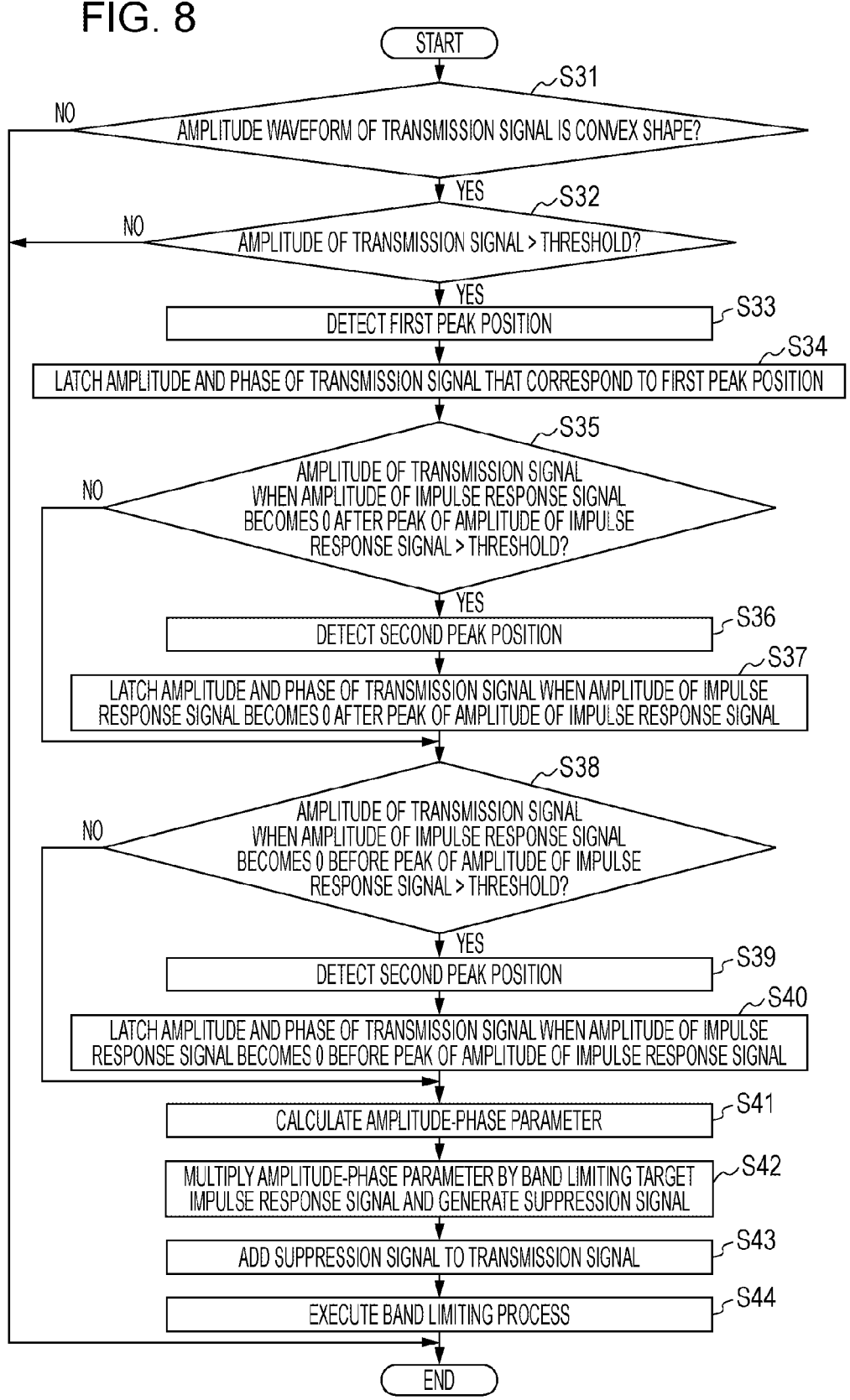
FIG. 8 is a flowchart of procedures of a peak suppression process that is executed by the peak suppressor according to the second embodiment.

Next, procedures of a peak suppression process that is executed by the peak suppressor 200 according to the second embodiment are described with reference to FIG. 8. FIG. 8 is a flowchart of the procedures of the peak suppression process that is executed by the peak suppressor 200 according to the second embodiment. A detailed description of procedures that are the same as those described with reference to FIG. 5 is omitted. Specifically, operations S11 to S21 illustrated in FIG. 5 correspond to operations S31 to S41 illustrated in FIG. 8, respectively.

Differences between the process procedures described in the first embodiment and process procedures that are described in the second embodiment are described below. As illustrated in FIG. 8, the complex multiplier 134 multiplies the amplitude-phase parameter by the band-limiting target impulse response signal and thereby generates a suppression signal (in operation S42). Then, the adder 150 adds the suppression signal to the transmission signal (in operation S43). The band-limiting filter 12 executes the band-limiting process on the combined signal output from the adder 150 (in operation S44).

As described above, in the second embodiment, since the band-limiting filter 12 is arranged in the peak suppressor 200, the peak suppression can be accurately executed, and the peak suppression and the band-limiting process can be simultaneously executed.

Third Embodiment

The first embodiment describes that a time when the amplitude of the impulse response signal is 0 matches a sampling position of the transmission signal. The time when the amplitude of the impulse response signal is 0, however, may not match the sampling position of the transmission signal. In this case, the amplitude-phase parameter calculator 133 does not acquire the amplitude and phase of the transmission signal when the amplitude of the impulse response signal is 0. Thus, the amplitude-phase parameter calculator 133 does not calculate an amplitude-phase parameter. In the third embodiment, an interpolation process is executed on the amplitude of the transmission signal corresponding to a sampling position of the transmission signal, and the amplitude and phase of the transmission signal when the amplitude of an impulse response signal is 0 are calculated. In the following description, parts that are the same as those described above are indicated by the same reference numerals and symbols as those described above, and a detailed description thereof is omitted.

Figure 9:
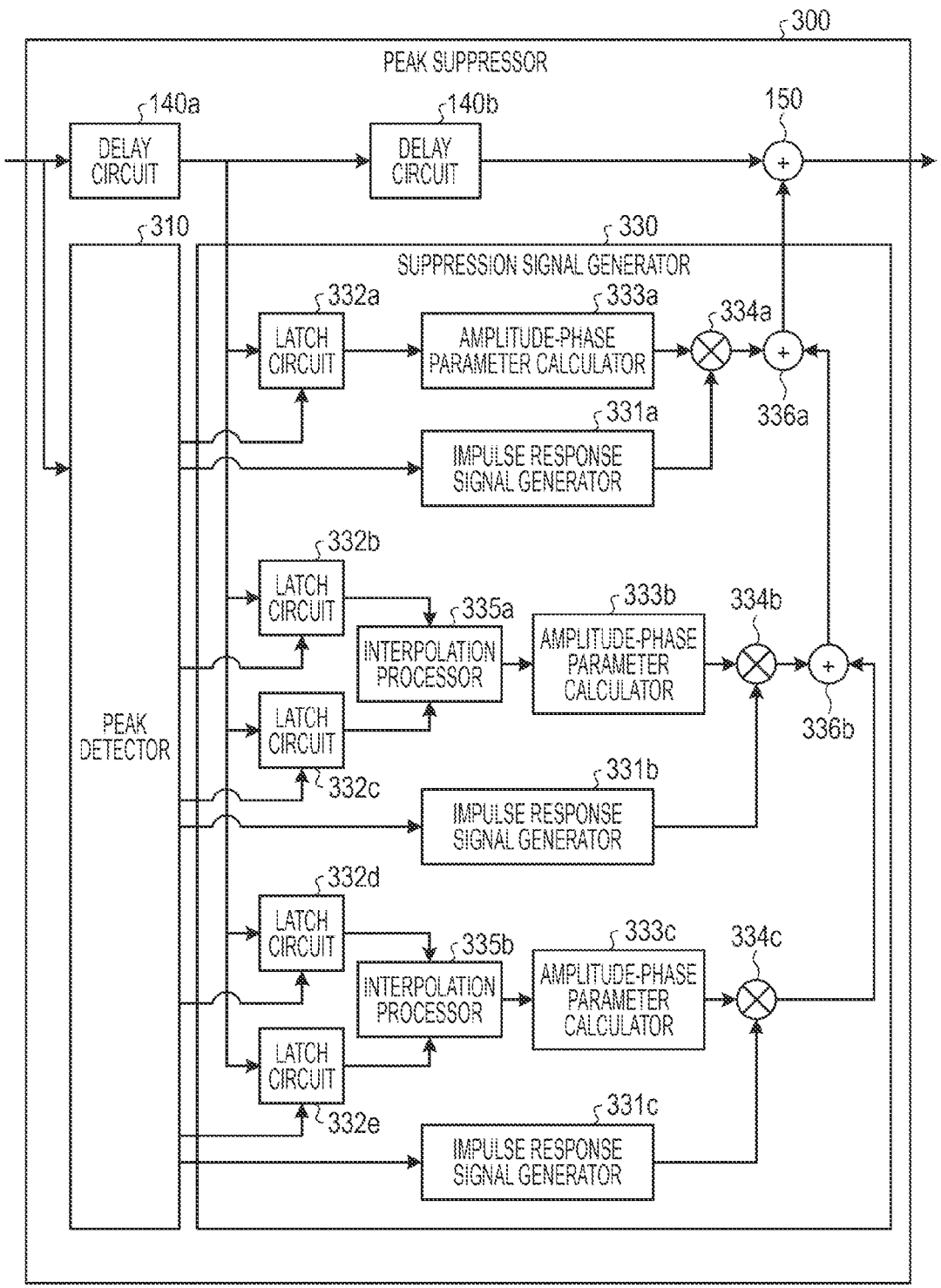
FIG. 9 is a block diagram illustrating the configuration of a peak suppressor according to a third embodiment.

The configuration of a peak suppressor 300 according to the third embodiment is described with reference to FIG. 9. FIG. 9 is a block diagram illustrating the configuration of the peak suppressor 300 according to the third embodiment. The configuration of a radio communication apparatus that includes the peak suppressor 300 according to the third embodiment is similar to the configuration illustrated in FIG. 1, and a description thereof is omitted.

As illustrated in FIG. 9, the peak suppressor 300 includes a peak detector 310, a suppression signal generator 330, the delay circuits 140a and 140b and the adder 150.

Figure 10:
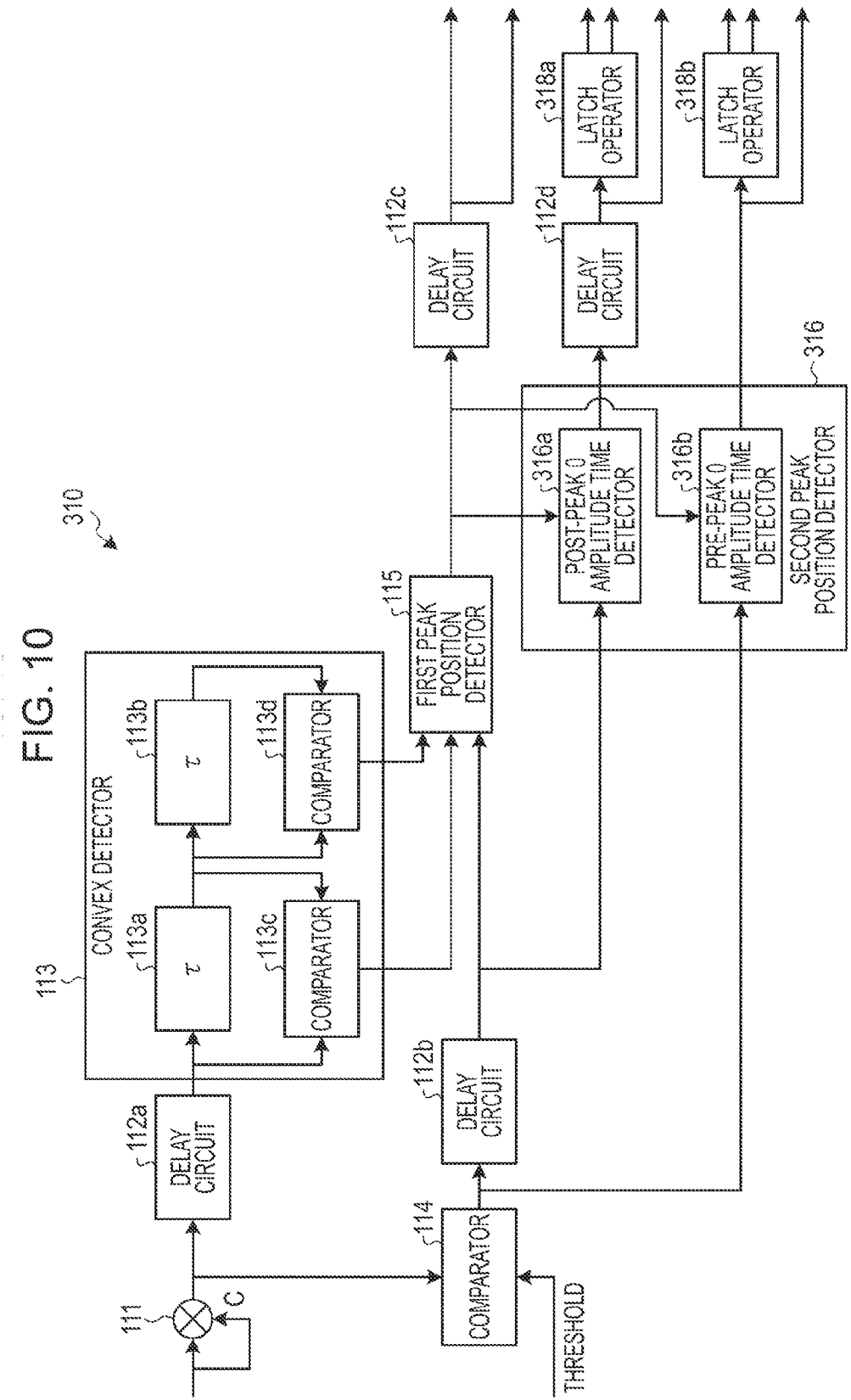
FIG. 10 is a block diagram illustrating the configuration of a peak detector according to the third embodiment.

The peak detector 310 detects the position of a peak included in the transmission signal. FIG. 10 is a block diagram illustrating the configuration of the peak detector 310 according to the third embodiment. The peak detector 310 includes the complex multiplier 111, the delay circuits 112a to 112d, the convex detector 113, the comparator 114, the first peak position detector 115, a second peak position detector 316 and latch operators 318a and 318b.

The peak position detector 115 detects, as a first peak position, a time when the amplitude of the transmission signal changes in a convex manner and exceeds the threshold Ath. The first peak position detector 115 outputs the detected first peak position through the delay circuit 112c to a latch circuit 332a and an impulse response signal generator 331a that are included in the suppression signal generator 330.

The second peak position detector 316 acquires the amplitude of the transmission signal that corresponds to at least two sampling positions of the transmission signal, while the sampling positions are adjacent to a time when the amplitude of an impulse response signal is 0. In the present embodiment, the second peak position detector 316 acquires the amplitude of the transmission signal that corresponds to two sampling positions of the transmission signal, while the two sampling positions are closest to the time when the amplitude of the impulse response signal is 0. When the amplitude of the transmission signal that corresponds to the two sampling positions exceeds the threshold Ath, the second peak position detector 316 detects the two sampling positions as second peak positions. The second peak position detector 316 includes a post-peak 0 amplitude time detector 316a and a pre-peak 0 amplitude time detector 316b.

When the post-peak 0 amplitude time detector 316a receives the first peak position from the first peak position detector 115, the post-peak 0 amplitude time detector 316a acquires the amplitude of the transmission signal that corresponds to two sampling positions that are adjacent to the time when the amplitude of the impulse response signal becomes 0 after a peak of the amplitude of the impulse response signal. When the amplitude of the transmission signal that corresponds to the two sampling positions (hereinafter referred to as "backward sampling positions") adjacent to the time when the amplitude of the impulse response signal becomes 0 after the peak of the amplitude of the impulse response signal exceeds the threshold Ath, the post-peak 0 amplitude time detector 316a detects the backward sampling positions as second peak positions. Specifically, when the post-peak 0 amplitude time detector 316a receives, from the comparator 114 through the delay circuit 112b, a true signal indicating that the amplitude of the transmission signal that corresponds to the backward sampling positions exceeds the threshold Ath, the post-peak 0 amplitude time detector 316a detects the backward sampling positions as the second peak positions. Then, the post-peak 0 amplitude time detector 316a outputs the backward sampling positions to an impulse response signal generator 331b of the suppression signal generator 330 through the delay circuit 112d, while the backward sampling positions are the detected second peak positions.

When the pre-peak 0 amplitude time detector 316b receives the first peak position from the first peak position detector 115, the pre-peak 0 amplitude time detector 316b acquires the amplitude of the transmission signal that corresponds to two sampling positions that are adjacent to the time when the amplitude of the impulse response signal becomes 0 before the peak of the amplitude of the impulse response signal. When the amplitude of the transmission signal that corresponds to the two sampling positions (hereinafter referred to as "forward sampling positions") adjacent to the time when the amplitude of the impulse response signal becomes 0 before the peak of the amplitude of the impulse response signal exceeds the threshold Ath, the pre-peak 0 amplitude time detector 316b detects the forward sampling positions as second peak positions. Specifically, when the pre-peak 0 amplitude time detector 316b receives, from the comparator 114, a true signal indicating that the amplitude of the transmission signal that corresponds to the forward sampling positions exceeds the threshold Ath, the pre-peak 0 amplitude time detector 316b detects the forward sampling positions as the second peak positions. Then, the pre-peak 0 amplitude time detector 316b outputs the forward sampling positions to an impulse response signal generator 331c of the suppression signal generator 330, while the forward sampling positions are the detected second peak positions.

The latch operator 318a receives the backward sampling positions from the post-peak 0 amplitude time detector 316a through the delay circuit 112d, while the backward sampling positions are the second peak positions. The latch operator 318a outputs, to latch circuits 332b and 332c of the suppression signal generator 330, an instruction to latch the amplitude and phase of the transmission signal that correspond to the backward sampling positions.

The latch operator 318b receives, from the pre-peak 0 amplitude time detector 316b, the forward sampling positions that are the second peak positions. The latch operator 318b outputs, to latch circuits 332d and 332e of the suppression signal generator 330, an instruction to latch the amplitude and phase of the transmission signal that correspond to the forward sampling positions.

Returning to FIG. 9, the suppression signal generator 330 generates a suppression signal. The suppression signal generator 330 includes the impulse response signal generators 331a to 331c, the latch circuits 332a to 332e, amplitude-phase parameter calculators 333a to 333c, complex multipliers 334a to 334c and adders 336a and 336b.

When receiving the first peak position and the second peak positions from the peak detector 310, the impulse response signal generators 331a to 331c generate impulse response signals that have peaks at times corresponding to the first peak position and the second peak positions. The impulse response signal generators 331a to 331c output the generated impulse response signals to the complex multipliers 334a to 334c, respectively.

The latch circuit 332a receives the first peak position from the peak detector 310. The latch circuit 332a receives the transmission signal from the delay circuit 140a. The latch circuit 332a latches the amplitude and phase of the transmission signal that correspond to the first peak position.

The amplitude-phase parameter calculator 333a calculates an amplitude-phase parameter that includes the difference between the threshold Ath and the latched amplitude of the transmission signal corresponding to the first peak position as the amplitude of a suppression signal and includes the latched phase of the transmission signal as the phase of the suppression signal.

The complex multiplier 334a receives the amplitude-phase parameter from the amplitude-phase parameter calculator 333a. The complex multiplier 334a receives the impulse response signal from the impulse response signal generator 331a. The complex multiplier 334a executes complex multiplication of the amplitude-phase parameter and the impulse response signal and thereby generates the suppression signal for suppressing the amplitude of the transmission signal corresponding to the first peak position to a value that is equal to or lower than the threshold Ath. The complex multiplier 334a outputs the generated suppression signal to the adder 336a.

The latch circuits 332b and 332c receive, from the peak detector 310, an instruction to latch the amplitude and phase of the transmission signal that correspond to the backward sampling positions. The latch circuits 332b and 332c receive the transmission signal from the delay circuit 140a. The latch circuits 332b and 332c latch the amplitude and phase of the transmission signal that correspond to the backward sampling positions.

An interpolation processor 335a executes an interpolation process on the amplitude and phases of the transmission signal that have been latched by the latch circuits 332b and 332c and correspond to the backward sampling positions, and thereby calculates the amplitude and phase of the transmission signal when the amplitude of the impulse response signal becomes 0 after the peak of the amplitude of the impulse response signal. The interpolation processor 335a outputs, to the amplitude-phase parameter calculator 333b, the calculated amplitude and phase of the transmission signal when the amplitude of the impulse response signal becomes 0 after the peak of the amplitude of the impulse response signal.

The amplitude-phase parameter calculator 333b calculates an amplitude-phase parameter. The amplitude-phase parameter calculated by the amplitude-phase parameter calculator 333b includes, as the amplitude of the suppression signal, the difference between the threshold Ath and the amplitude of the transmission signal when the amplitude of the impulse response signal becomes 0 after the peak of the amplitude of the impulse response signal. The amplitude-phase parameter calculated by the amplitude-phase parameter calculator 333b also includes, as the phase of the suppression signal, the phase of the transmission signal when the amplitude of the impulse response signal becomes 0 after the peak of the amplitude of the impulse response signal.

The complex multiplier 334b receives the amplitude-phase parameter from the amplitude-phase parameter calculator 333b. The complex multiplier 334b receives the impulse response signal from the impulse response signal generator 331b. The complex multiplier 334b executes complex multiplication of the amplitude-phase parameter and the impulse response signal and generates a suppression signal for suppressing the amplitude of the transmission signal when the amplitude of the impulse response signal becomes 0 after the peak of the amplitude of the impulse response signal to a value that is equal to or lower than the threshold Ath. The complex multiplier 334b outputs the generated suppression signal to the adder 336b.

The latch circuits 332d and 332e receive, from the peak detector 310, an instruction to latch the amplitude and phase of the transmission signal that correspond to the forward sampling positions. The latch circuits 332d and 332e receive the transmission signal from the delay circuit 140a. The latch circuits 332d and 332e latch the amplitude and phase of the transmission signals that correspond to the forward sampling positions.

An interpolation processor 335b executes an interpolation process on the amplitude and phase of the transmission signal when the amplitude of the impulse response signal becomes 0 before the peak of the amplitude of the impulse response signal, and whereby the interpolation processor 335b calculates the amplitude and phase of the transmission signal when the amplitude of the impulse response signal becomes 0 before the peak of the amplitude of the impulse response signal. The interpolation processor 335b outputs, to the amplitude-phase parameter calculator 333c, the calculated amplitude and phase of the transmission signal when the amplitude of the impulse response signal becomes 0 before the peak of the amplitude of the impulse response signal.

The amplitude-phase parameter calculator 333c calculates an amplitude-phase parameter. The amplitude-phase parameter calculated by the amplitude-phase parameter calculator 333c includes, as the amplitude of the suppression signal, the difference between the threshold Ath and the amplitude of the transmission signal when the amplitude of the impulse response signal becomes 0 before the peak of the amplitude of the impulse response signal. The amplitude-phase parameter calculated by the amplitude-phase parameter calculator 333c also includes, as the phase of the suppression signal, the phase of the transmission signal when the amplitude of the impulse response signal becomes 0 before the peak of the amplitude of the impulse response signal.

The complex multiplier 334c receives the amplitude-phase parameter from the amplitude-phase parameter calculator 333c. The complex multiplier 334c receives the impulse response signal from the impulse response signal generator 331c. The complex multiplier 334c executes complex multiplication of the amplitude-phase parameter and the impulse response signal and thereby generates a suppression signal for suppressing the amplitude of the transmission signal when the amplitude of the impulse response signal becomes 0 before the peak of the amplitude of the impulse response signal to a value that is equal to or lower than the threshold Ath. The complex multiplier 334c outputs the generated suppression signal to the adder 336b.

The adder 336b adds the suppression signal output from the complex multiplier 334b to the suppression signal output from the complex multiplier 334c and outputs a suppression signal obtained by summing the suppression signals to the adder 336a. The adder 336a adds the suppression signal output from the complex multiplier 334a to the suppression signal output from the adder 336b and outputs a suppression signal obtained by summing the suppression signals to the adder 150.

Figure 11:
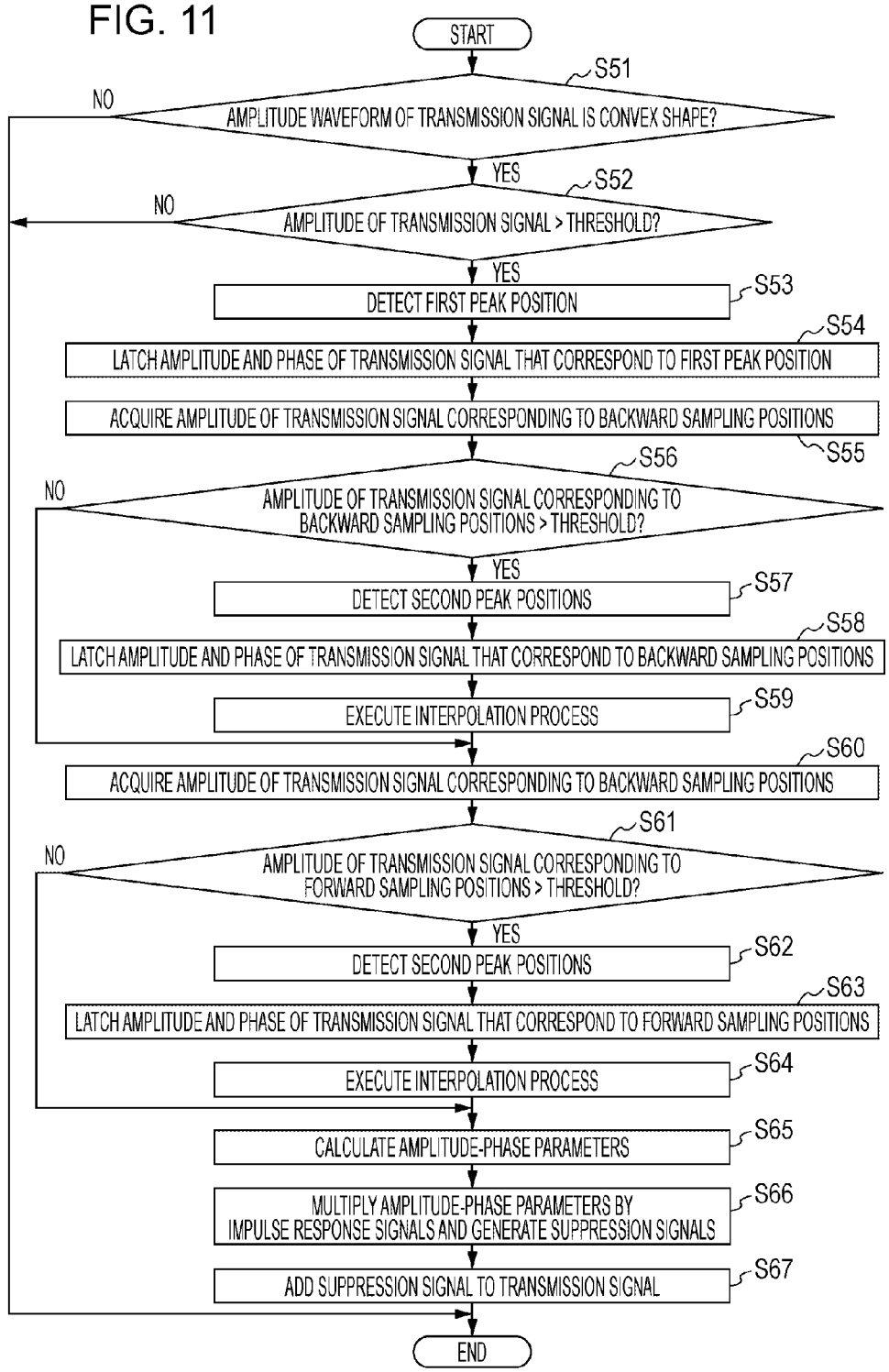
FIG. 11 is a flowchart of procedures of a peak suppression process that is executed by the peak suppressor according to the third embodiment.

Next, procedures of a peak suppression process that is executed by the peak suppressor 300 according to the third embodiment are described with reference to FIG. 11. FIG. 11 is a flowchart of the procedures of the peak suppression process that is executed by the peak suppressor 300 according to the third embodiment. A detailed description of procedures that are the same as those described with reference to FIG. 5 is omitted. Specifically, operations S11 to S14 illustrated in FIG. 5 correspond to operations S51 to S54 illustrated in FIG. 11, respectively.

Differences between the process procedures described in the first embodiment and process procedures that are described in the third embodiment are described below. As illustrated in FIG. 11, the latch circuit 332a of the suppression signal generator 330 latches the amplitude and phase of the transmission signal that correspond to the detected first peak position (in operation S54).

The post-peak 0 amplitude time detector 316a of the second peak position detector 316 acquires the amplitude and phase of the transmission signal that correspond to the backward sampling positions (in operation S55). If the amplitude of the transmission signal that corresponds to the backward sampling positions is equal to or lower than the threshold Ath (No in operation S56), the post-peak 0 amplitude time detector 316a causes the process to proceed to S60. If the amplitude of the transmission signal that corresponds to the backward sampling positions exceeds the threshold Ath (Yes in operation S56), the post-peak 0 amplitude time detector 316a detects the backward sampling positions as second peak positions (in operation S57). The latch circuits 332b and 332c of the suppression signal generator 330 latch the amplitude and phase of the transmission signal that correspond to the backward sampling positions that are the second peak positions (in operation S58). The interpolation processor 335a executes the interpolation process on the amplitude and phase of the transmission signal that have been latched by the latch circuits 332b and 332c and correspond to the backward sampling positions, and calculates the amplitude and phase of the transmission signal when the amplitude of the impulse response signal becomes 0 after the peak of the amplitude of the impulse response signal (in operation S59).

The pre-peak 0 amplitude time detector 316b of the second peak position detector 316 acquires the amplitude of the transmission signal that corresponds to the forward sampling positions (in operation S60). If the amplitude of the transmission signal that corresponds to the forward sampling positions is equal to or lower than the threshold Ath (No in operation S61), the pre-peak 0 amplitude time detector 316b causes the process to proceed to S65. If the amplitude of the transmission signal that corresponds to the forward sampling positions exceeds the threshold Ath (Yes in operation S61), the pre-peak 0 amplitude time detector 316b detects the forward sampling positions as second peak positions (in operation S62). The latch circuits 332d and 332e of the suppression signal generator 330 latch the amplitude and phase of the transmission signal that correspond to the forward sampling positions that are the second peak positions (in operation S63). Then, the interpolation processor 335b executes the interpolation process on the amplitude and phase of the transmission signal that have been latched by the latch circuits 332d and 332e and correspond to the forward sampling positions, and calculates the amplitude and phase of the transmission signal when the amplitude of the impulse response signal becomes 0 before the peak of the amplitude of the impulse response signal (in operation S64).

The amplitude-phase parameter calculator 333a calculates an amplitude-phase parameter that includes the difference between the threshold Ath and the amplitude of the transmission signal corresponding to the first peak position as the amplitude of the suppression signal and includes the latched phase of the transmission signal as the phase of the suppression signal (in operation S65). The amplitude-phase parameter calculator 333b calculates an amplitude-phase parameter (in operation S65). The amplitude-phase parameter calculated by the amplitude-phase parameter calculator 333b includes, as the amplitude of the suppression signal, the difference between the threshold Ath and the amplitude of the transmission signal when the amplitude of the impulse response signal becomes 0 after the peak of the amplitude of the impulse response signal. The amplitude-phase parameter calculated by the amplitude-phase parameter calculator 333b also includes, as the phase of the suppression signal, the phase of the transmission signal when the amplitude of the impulse response signal becomes 0 after the peak of the amplitude of the impulse response signal. The amplitude-phase parameter calculator 333c calculates an amplitude-phase parameter (in operation S65). The amplitude-phase parameter calculated by the amplitude-phase parameter calculator 333c includes, as the amplitude of the suppression signal, the difference between the threshold Ath and the amplitude of the transmission signal when the amplitude of the impulse response signal becomes 0 before the peak of the amplitude of the impulse response signal. The amplitude-phase parameter calculated by the amplitude-phase parameter calculator 333c also includes, as the phase of the suppression signal, the phase of the transmission signal when the amplitude of the impulse response signal becomes 0 before the peak of the amplitude of the impulse response signal.

The complex multipliers 334a to 334c execute complex multiplication of the amplitude-phase parameters and the impulse response signals and generate suppression signals (in operation S66). The adder 150 adds a suppression signal output from the adder 336a to the transmission signal (in operation S67).

As described above, in the third embodiment, the interpolation process is executed on the amplitude of the transmission signal that corresponds to the sampling positions of the transmission signal, and whereby the amplitude and phase of the transmission signal when the amplitude of the impulse response signal becomes 0 are calculated. In the third embodiment, even when a time when amplitude of the impulse response signal becomes 0 does not match a sampling position of the transmission signal, the peak suppression can be accurately executed.

Fourth Embodiment

The third embodiment describes that the band-limiting filter 12 is arranged outside the peak suppressor 100. The fourth embodiment describes that the band-limiting filter 12 is arranged in the peak suppressor 100. In the following description, parts that are the same as those described above are indicated by the same reference numerals and symbols as those described above, and a detailed description thereof is omitted.

Figure 12:
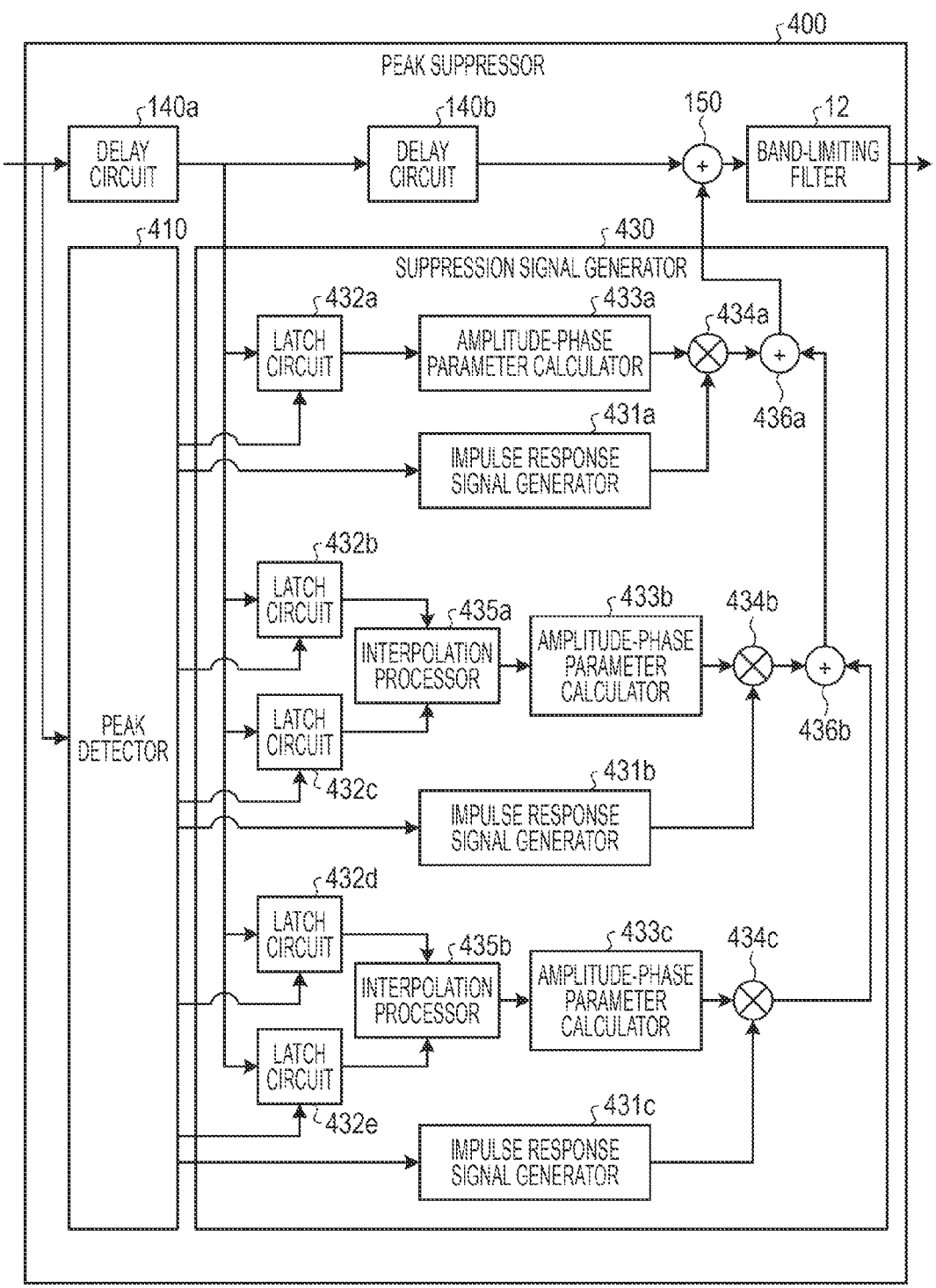
FIG. 12 is a block diagram illustrating the configuration of a peak suppressor according to a fourth embodiment.

The configuration of a peak suppressor 400 according to the fourth embodiment is described with reference to FIG. 12. FIG. 12 is a block diagram illustrating the configuration of the peak suppressor 400 according to the fourth embodiment. The configuration of a radio communication apparatus that includes the peak suppressor 400 according to the fourth embodiment is similar to the configuration illustrated in FIG. 6, and a description thereof is omitted.

As illustrated in FIG. 12, the peak suppressor 400 includes a peak detector 410, a suppression signal generator 430, the delay circuits 140a and 140b, the adder 150 and the band-limiting filter 12. The suppression signal generator 430 includes impulse response signal generators 431a to 431c, latch circuits 432a to 432e, amplitude-phase parameter calculators 433a to 433c, complex multipliers 434a to 434c, interpolation processors 435a and 435b and adders 436a and 436b.

The peak detector 410 has the same configuration as the peak detector 310 described in the third embodiment, and a description thereof is omitted.

The suppression signal generator 430 has the same configuration as the suppression signal generator 330 described in the third embodiment. Thus, constituent elements that are included in the suppression signal generator 430 and are the same as those included in the suppression signal generator 330 are indicated by reference symbols with the same last characters as those included in the suppression signal generator 330, and a detailed description thereof is omitted. Main differences between the third and fourth embodiments are described below.

When the band-limiting filter 12 executes the band-limiting process on the combined signal, the impulse response signal generators 431a to 431c each generate, as an impulse response signal, an impulse-like signal that has an amplitude including the amount of a change in the amplitude of the combined signal. Hereinafter, the impulse response signals generated by the impulse response signal generators 431a to 431c are referred to as "band-limiting target impulse response signals". The impulse response signal generators 431a to 431c output the band-limiting target impulse response signals to the complex multipliers 434a to 434c, respectively. The complex multipliers 434a to 434c multiply the interested band-limiting target impulse response signals by amplitude-phase parameters and thereby generate suppression signals, respectively.

Next, procedures of a peak suppression process that is executed by the peak suppressor 400 according to the fourth embodiment are described with reference to FIG. 13. FIG. 13 is a flowchart of the procedures of the peak suppression process that is executed by the peak suppressor 400 according to the fourth embodiment. A detailed description of process procedures that are the same as those described with reference to FIG. 11 is omitted. Specifically, operations S51 to S65 illustrated in FIG. 11 correspond to operations S71 to S85 illustrated in FIG. 13, respectively.

Differences between the process procedures described in the third embodiment and process procedures that are described in the fourth embodiment are described below. As illustrated in FIG. 13, the complex multipliers 434a to 434c execute complex multiplication of the amplitude-phase parameters and the band-limiting target impulse response signals and generate suppression signals (in operation S86). Then, the adder 150 adds a suppression signal output from the adder 436a to the transmission signal (in operation S87). The band-limiting filter 12 executes the band-limiting process on a combined signal output from the adder 150 (in operation S88).

As described above, in the fourth embodiment, the band-limiting filter 12 is arranged in the peak suppressor 400. Thus, the peak suppression can be accurately executed, and the peak suppression and the band-limiting process can be simultaneously executed.

As described above in the embodiments, techniques disclosed herein are to provide a peak suppressor, a radio communication apparatus and a peak suppression method, which enable the accuracy of suppression to be improved while suppressing an increase in the size of a circuit and an increase in a processing load.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A peak suppressor comprising:
   a first peak position detector configured to detect a first time when amplitude of a transmission signal changes in a convex manner and exceeds a specific level as a first peak position;
   a second peak position detector configured to detect a second time that is different by a predetermined time from the first peak position when the amplitude of the transmission signal exceeds the specific level as a second peak position;

a suppression signal generator configured to generate a suppression signal for suppressing the amplitude of the transmission signal to a value that is equal to or lower than the specific level, based on amplitude and phase of the transmission signal corresponding to the first and second peak positions detected by the first and second peak position detectors;

an adder configured to add the suppression signal generated by the suppression signal generator to the transmission signal; and a band-limiting filter configured to execute a band-limiting process on a signal combined by adding the suppression signal to the transmission signal by the adder, wherein the suppression signal generator includes:
- an impulse response signal generator configured to generate an impulse response signal that is an impulse-like signal;
- a latch circuit configured to latch the amplitude and phase of the transmission signal corresponding to the first and second peak positions;
- an amplitude-phase parameter calculator configured to calculate an amplitude-phase parameter including a difference between the amplitude latched by the latch circuit and the specific level as the amplitude of the suppression signal, and calculate the phase latched by the latch circuit as the phase of the suppression signal; and
- a multiplier configured to multiple the amplitude-phase parameter calculated by the amplitude-phase parameter calculator by the impulse response signal so as to generate the suppression signal, and wherein the impulse response signal generator generates, as the impulse response signal, the impulse-like signal having an amplitude including an amount of a change in the amplitude of the combined signal, the change in the amplitude of the combined signal being caused by the band-limiting process executed on the combined signal.

2. The peak suppressor according to claim 1, wherein the second peak position detector detects a time when the amplitude of the impulse response signal is 0 as the second peak position, when the amplitude of the transmission signal corresponding to the detected time exceeds the specific level.

3. The peak suppressor according to claim 1, wherein the second peak position detector detects a time when the amplitude of the impulse response signal is 0 as the second peak position, when the amplitude of the transmission signal corresponding to the detected time exceeds the specific level.

4. The peak suppressor according to claim 2,
wherein, when the amplitude of the transmission signal corresponding to at least two sampling positions of the transmission signal that are adjacent to the time when the amplitude of the impulse response signal is 0 exceeds the specific level, the second peak position detector detects the sampling positions as second peak positions,
wherein the latch circuit of the suppression signal generator latches the amplitude and phase of the transmission signal corresponding to the sampling positions,
wherein the suppression signal generator further includes an interpolation processor configured to execute an interpolation process on the amplitude and phase of the transmission signal corresponding to the sampling positions, latched by the latch circuit so as to calculate the amplitude and phase of the transmission signal when the amplitude of the impulse response signal is 0, and
wherein the amplitude-phase parameter calculator calculates the amplitude-phase parameter including the difference between the specific level and the amplitude calculated by the interpolation processor as the amplitude of the suppression signal, and including the phase calculated by the interpolation processor as the phase of the suppression signal.

5. The peak suppressor according to claim 3,
wherein, when the amplitude of the transmission signal corresponding to at least two sampling positions of the transmission signal that are adjacent to the time when the amplitude of the impulse response signal is 0 exceeds the specific level, the second peak position detector detects the sampling positions as second peak positions,
wherein the latch circuit of the suppression signal generator latches the amplitude and phase of the transmission signal corresponding to the sampling positions,
wherein the suppression signal generator further includes an interpolation processor configured to execute an interpolation process on the amplitude and phase of the transmission signal corresponding to the sampling positions, latched by the latch circuit so as to calculate the amplitude and phase of the transmission signal when the amplitude of the impulse response signal is 0, and
wherein the amplitude-phase parameter calculator calculates the amplitude-phase parameter including the difference between the specific level and the amplitude calculated by the interpolation processor as the amplitude of the suppression signal, and including the phase calculated by the interpolation processor as the phase of the suppression signal.

6. A radio communication apparatus comprising:
a first peak position detector configured to detect a first time when the amplitude of the transmission signal changes in a convex manner and exceeds a specific level as a first peak position;
a second peak position detector configured to detect a second time that is different by a predetermined time from the first peak position when the amplitude of the transmission signal exceeds the specific level as a second peak position;
a suppression signal generator configured to generate a suppression signal for suppressing the amplitude of the transmission signal to a value that is equal to or lower than the specific level, based on amplitude and phase of the transmission signal corresponding to the first and second peak positions detected by the first and second peak position detectors;
a suppression signal combining unit configured to combine the suppression signal with the transmission signal;
an amplifier configured to amplify a signal output from the suppression signal combining unit; and
a band-limiting filter configured to execute a band-limiting process on the signal output from the suppression signal combining unit,
wherein the suppression signal generator includes:
- an impulse response signal generator configured to generate an impulse response signal that is an impulse-like signal;
- a latch circuit configured to latch the amplitude and phase of the transmission signal corresponding to the first and second peak positions;
- an amplitude-phase parameter calculator configured to calculate an amplitude-phase parameter including a difference between the amplitude latched by the circuit and the specific level as the amplitude of the suppression signal, and calculate the phase latched by the latch circuit as the phase of the suppression signal; and a multiplier configured to multiple the amplitude-phase parameter calculated by the amplitude-phase parameter calculator by the impulse response signal so as to generate the suppression signal, and wherein the impulse response signal generator generates, as the impulse response signal, the impulse-like signal having an amplitude including an amount of a change in the amplitude of the combined signal, the change in the amplitude of the combined signal being caused by the band-limiting process executed on the combined signal.

7. A peak suppression method comprising:

detecting a first time when amplitude of the transmission signal changes in a convex manner and exceeds a specific level as a first peak position;

detecting a time that is different by a predetermined time from the first peak position when the amplitude of the transmission signal exceeds the specific level as a second peak position;

generating a suppression signal for suppressing the amplitude of the transmission signal to a value that is equal to or lower than the specific level, based on amplitude and phase of the transmission signal corresponding to the first and second peak positions; and combining the suppression signal with the transmission signal, by a peak suppressor; and executing a band-limiting process on the combined signal, wherein the suppression signal generating includes:

generating an impulse response signal that is an impulse-like signal;

latching the amplitude and phase of the transmission signal corresponding to the first and second peak positions;

calculating an amplitude-phase parameter including a difference between the latched amplitude and the specific level as the amplitude of the suppression signal, and calculating the latched phase as the phase of the suppression signal; and multiplying the calculated amplitude-phase parameter by the impulse response signal so as to generate the suppression signal, and wherein the impulse response signal generating generates, as the impulse response signal, the impulse-like signal having an amplitude including an amount of a change in the amplitude of the combined signal, the change in the amplitude of the combined signal being caused by the band-limiting process executed on the combined signal.

* * * * *